Jan. 21, 1964     D. M. SCHWARTZ     3,118,323

GEARED TURN TRANSMISSION

Filed June 20, 1960     9 Sheets-Sheet 1

INVENTOR
DANIEL M. SCHWARTZ

BY *Stowell & Stowell*

ATTORNEYS

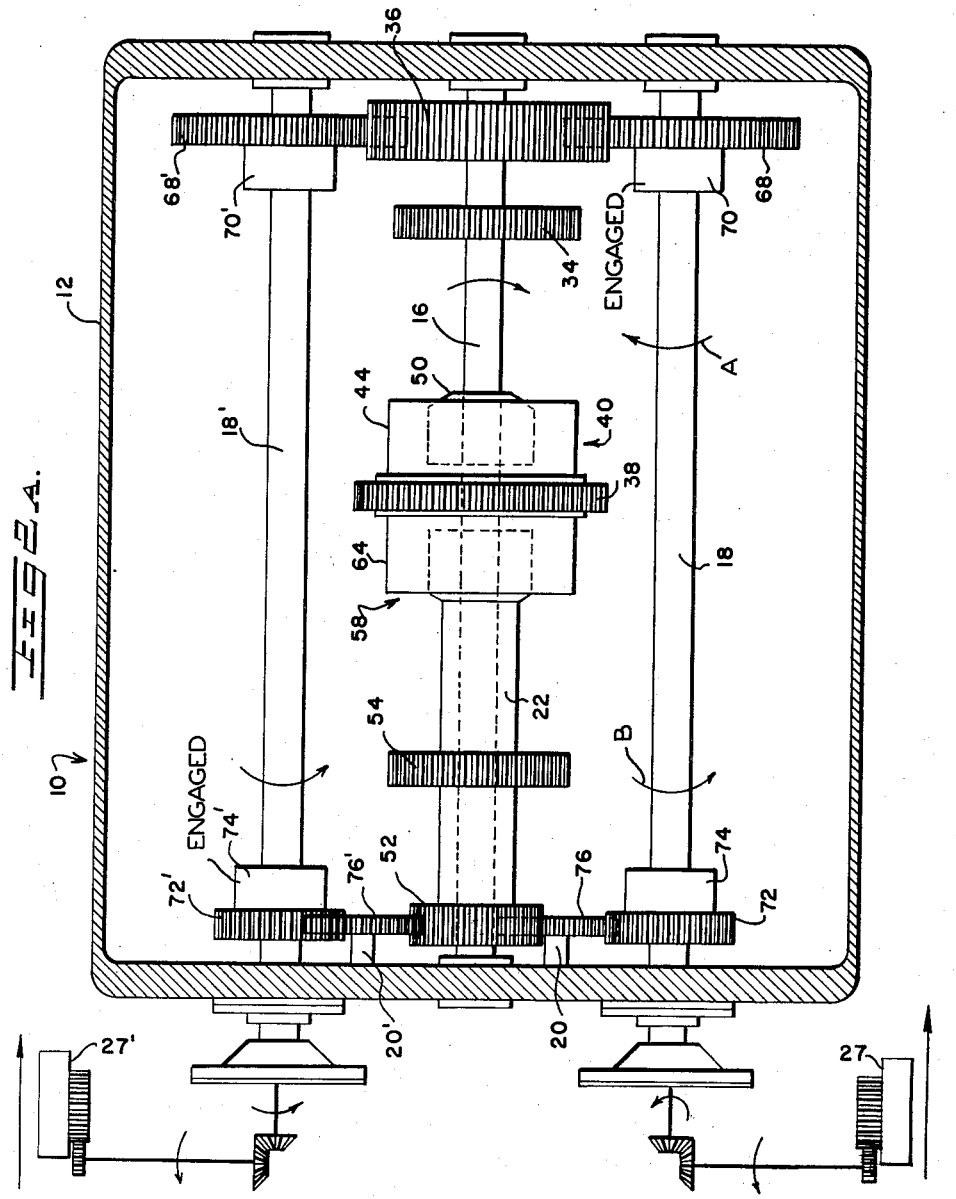

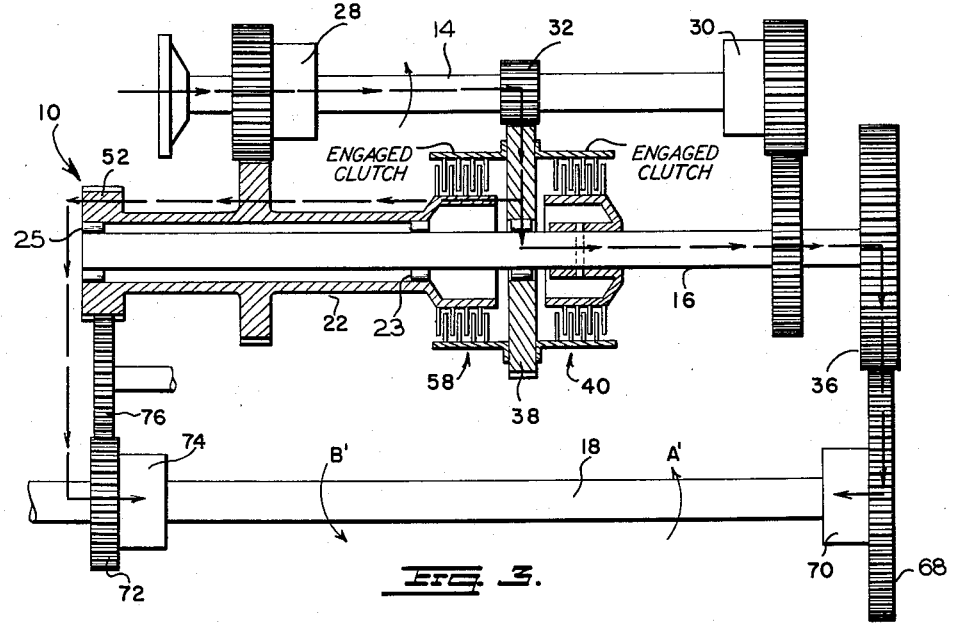
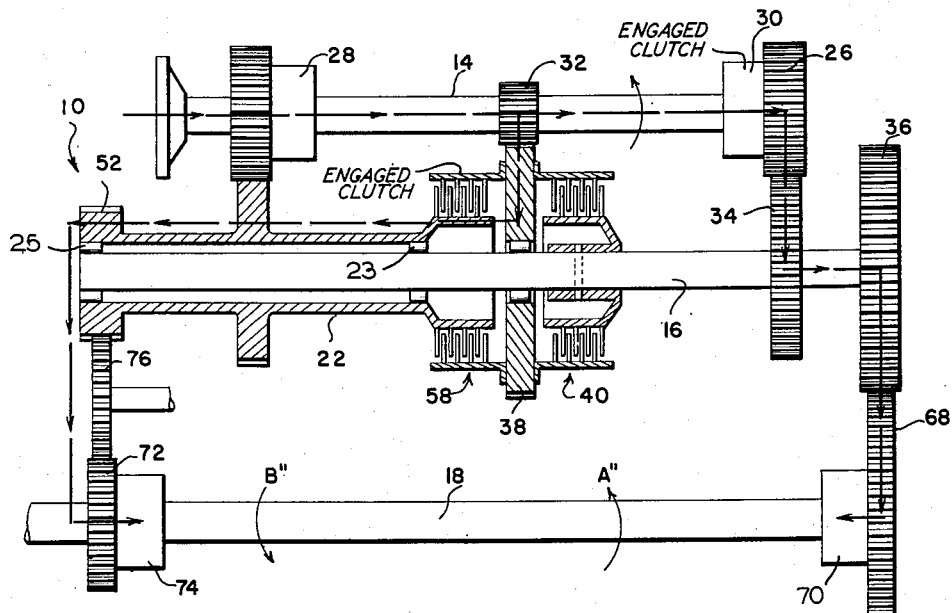

Jan. 21, 1964 D. M. SCHWARTZ 3,118,323
GEARED TURN TRANSMISSION
Filed June 20, 1960 9 Sheets-Sheet 4

ENGAGED
ENGAGED

INVENTOR
DANIEL M. SCHWARTZ
BY Stowell & Stowell
ATTORNEYS

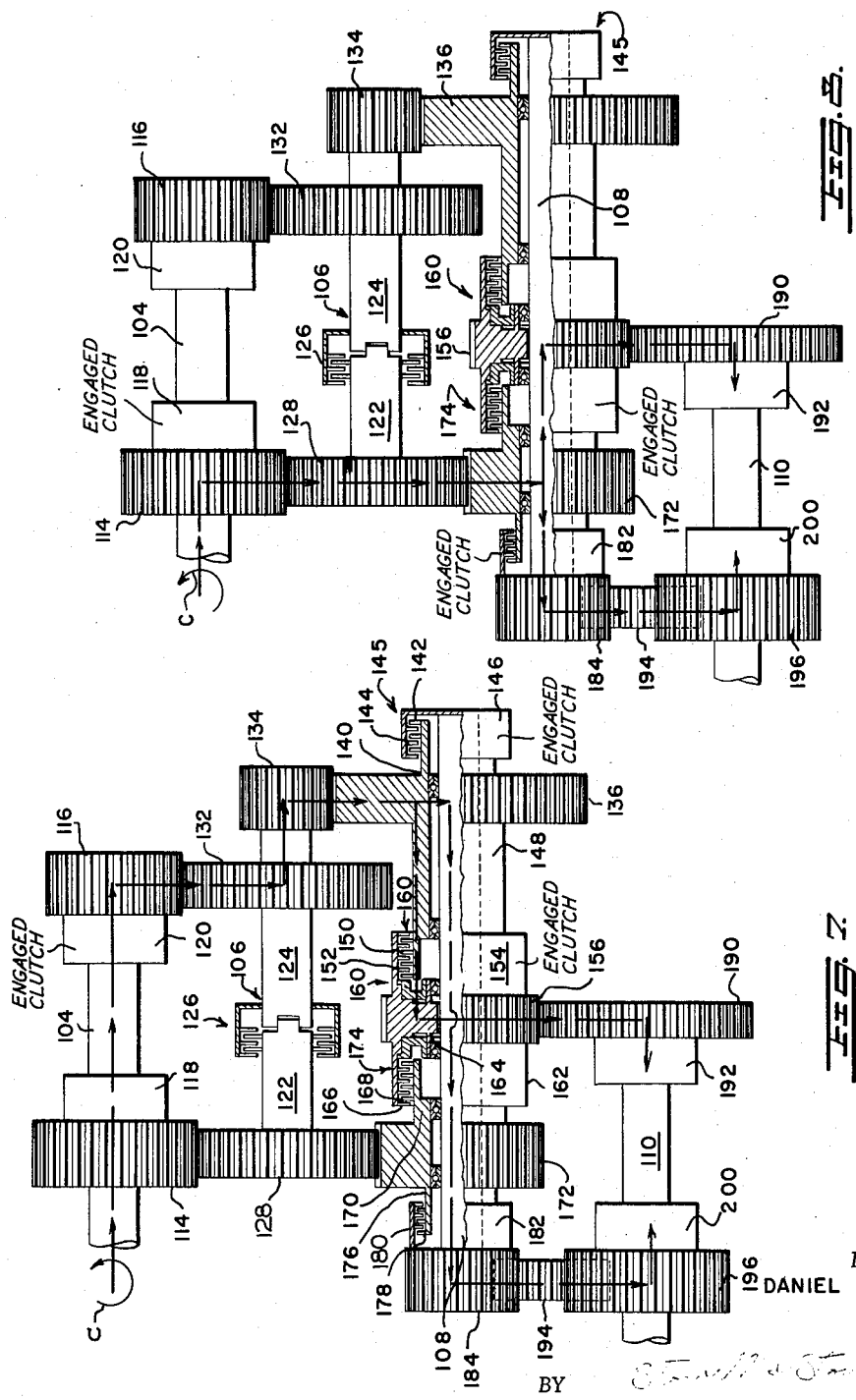

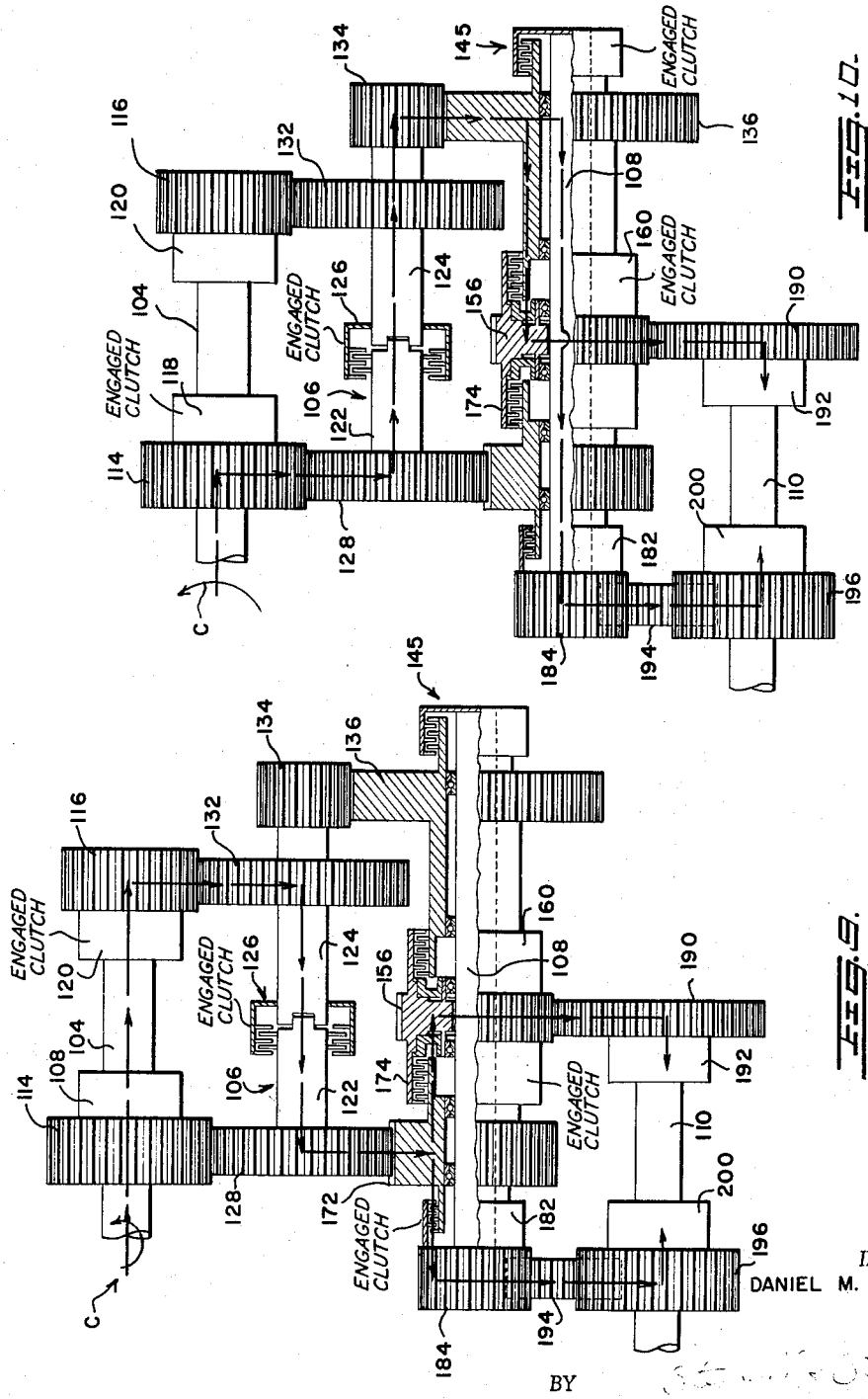

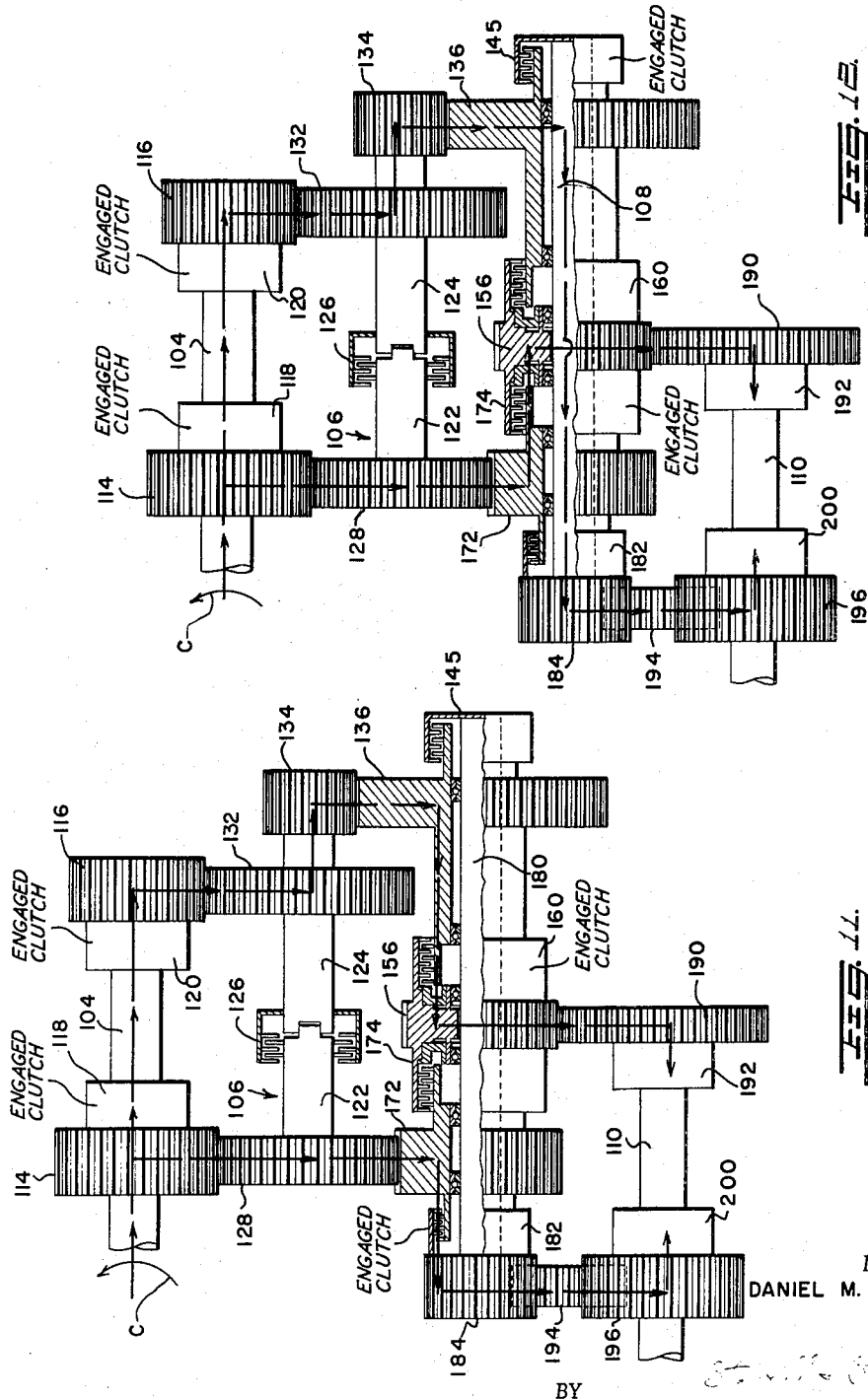

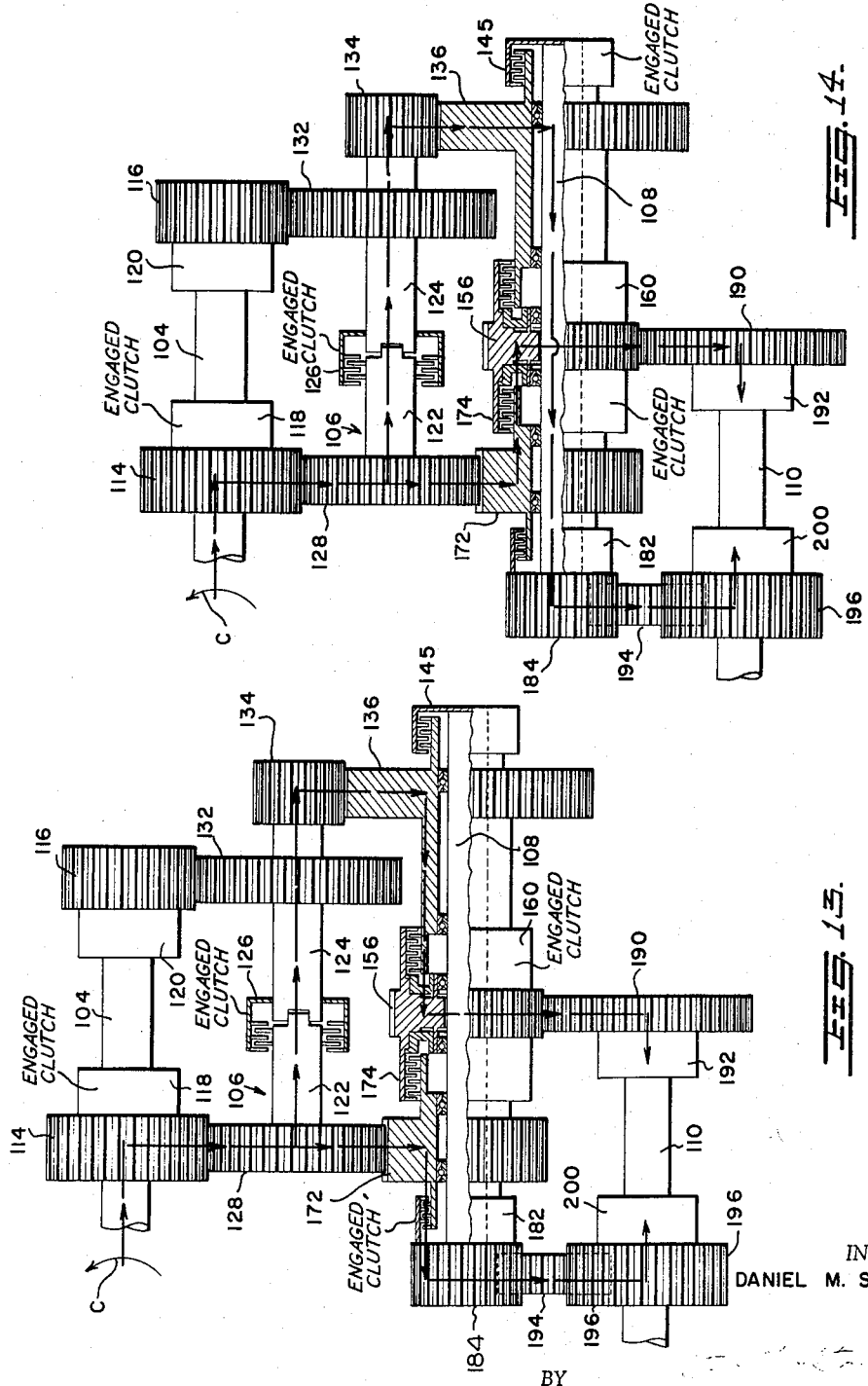

Jan. 21, 1964     D. M. SCHWARTZ     3,118,323
GEARED TURN TRANSMISSION
Filed June 20, 1960                                            9 Sheets-Sheet 9
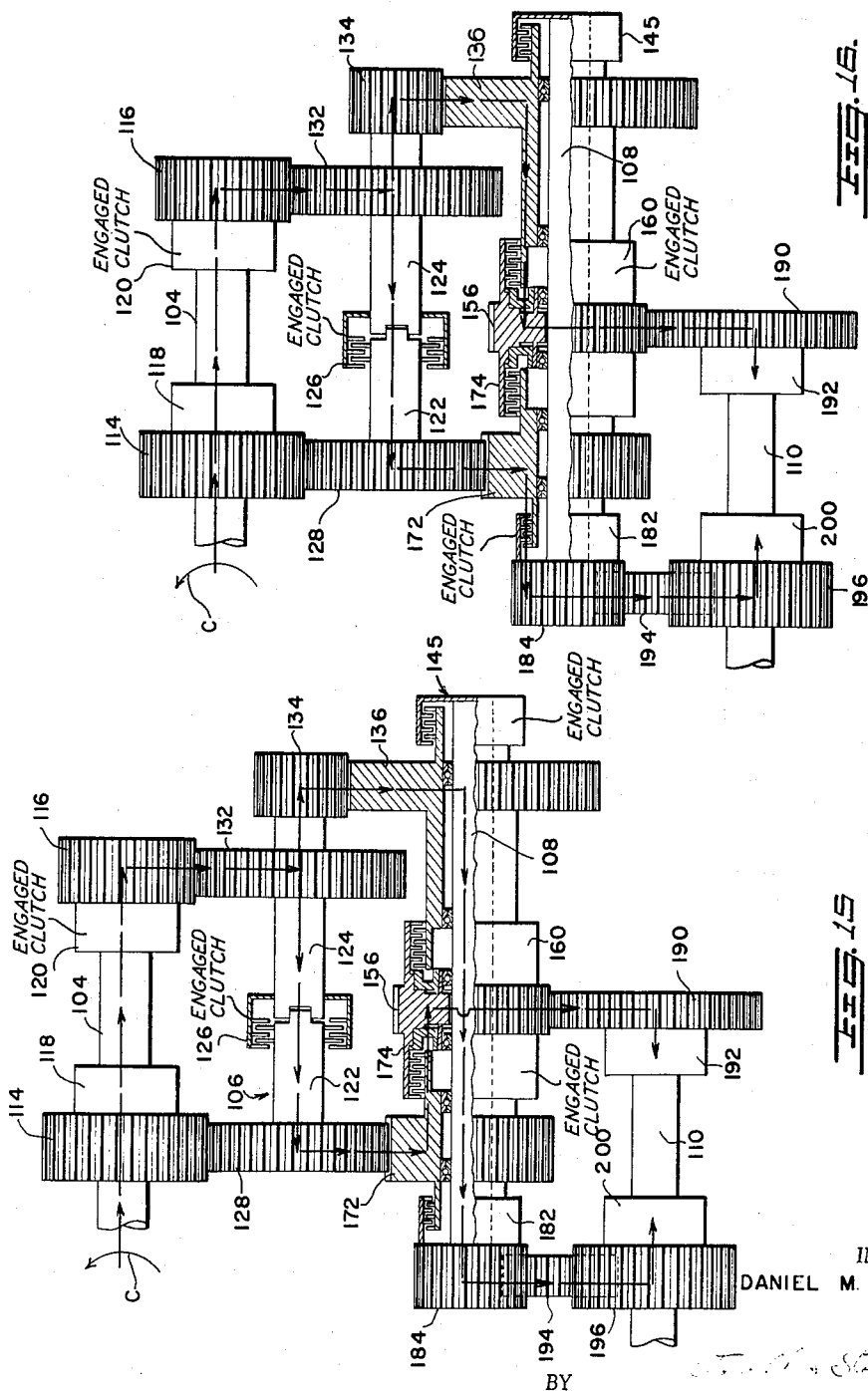
INVENTOR
DANIEL M. SCHWARTZ
BY
ATTORNEY

United States Patent Office 3,118,323
Patented Jan. 21, 1964

1

3,118,323
GEARED TURN TRANSMISSION
Daniel M. Schwartz, 1792 Millbrooke Road,
Salt Lake City, Utah
Filed June 20, 1960, Ser. No. 37,253
18 Claims. (Cl. 74—720.5)

This invention relates to new and improved power transmission means and particularly to multiple speed reversible transmissions having a single power input shaft and paired power output shafts.

While multiple speed constant mesh reversible transmissions having dual output shafts wherein the operator may selectively drive either output shaft in the forward or reverse direction of rotation or drive both of the output shafts in the same direction of rotation at the same relative speed are known, the transmissions of the present invention permit the operator to selectively drive the output shafts in the same or opposite direction of rotation at different selected speed ratios relative to each other.

It is a particular object of the present invention to provide a constant mesh multiple speed reversing transmission having paired power output shafts wherein the output shafts are selectively driven at preselected speeds relative to the input shaft and at selected speed ratios and directions of rotation relative to each other.

A further object is to provide such power transmitting means wherein reversal in direction and speed change of the output shafts are obtained without reversal of rotation of any of the gears in the transmission.

These and other objects and advantages of the power transmitting means of the invention will appear more clearly from the following detailed description when read in conjunction with the attached drawings wherein:

FIG. 2a is a section substantially on line 2a—2a of FIG. 1 illustrating the arrangement of the dual output shafts of the transmission and a diagrammatic showing of connecting means between the transmission and paired traction devices;

FIG. 3 is a schematic view like FIG. 2 illustrating the power path used in the forward or reverse drive of one of the dual output shafts in the second speed range;

FIG. 4 is a schematic view like FIG. 2 illustrating the power path used in the forward drive of one of the dual output shafts in the high speed range or the reverse drive of the same shaft in the low speed range;

FIG. 7 is a schematic view of the transmission substantially on line 7—7 of FIG. 5 illustrating the power path used in the forward or reverse drive of one of the dual output shafts in the first speed range;

2

Figure 1:
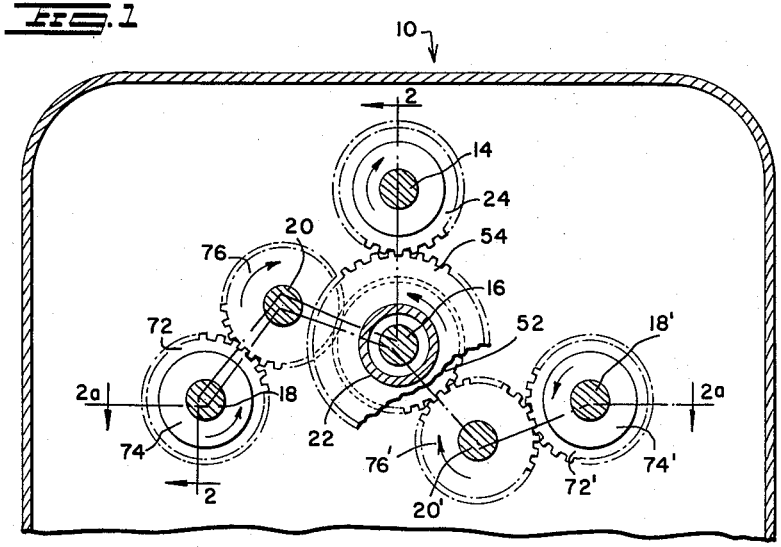
FIG. 1 is a fragmentary sectional view of a transmission embodying the principles of the present invention substantially on line 1—1 of FIG. 2.

FIG. 8 is a schematic view like FIG. 7 illustrating the power path used in the forward or reverse drive of one of the dual output shafts in the fourth speed range;

FIG. 9 is a schematic view like FIG. 7 illustrating the power path used in the forward or reverse drive of one of the dual output shafts in the third speed range;

FIG. 10 is a schematic view like FIG. 7 illustrating the power path used in the forward or reverse drive of one of the dual output shafts in the second speed range;

FIG. 11 is a schematic view like FIG. 7 illustrating the power path for a geared turn wherein the illustrated output shaft may be driven in the first speed range in the forward direction or the fourth speed range in the reverse direction;

FIG. 12 is a schematic view like FIG. 7 showing the power path for the illustrated output shaft wherein the output shaft may be driven in the forward drive in the fourth speed range or the reverse drive in the first speed range;

FIG. 13 is a schematic view like FIG. 7 showing the power path used in the forward drive of the illustrated output shaft in the second speed range or the reverse drive in the fourth speed range;

FIG. 14 is a schematic view like FIG. 7 illustrating the power path used for the forward drive in the fourth speed range for the illustrated output shaft or the reverse drive of the output shaft in the second speed range;

FIG. 15 is a schematic view like FIG. 7 illustrating the power path used in the forward drive of the illustrated output shaft in the third speed range or the reverse drive of said output shaft in the first speed range; and FIG. 16 is a schematic view like FIG. 7 illustrating the power path used in the forward drive in the first speed range for the illustrated output shaft or the reverse drive of said output shaft in the third speed range.

Referring to the drawings and, in particular, FIGS. 1 through 4, there is shown an improved geared turn transmission 10 having a housing 12 which rotatably supports therein plural parallel shafting, change speed and reverse gearing and plural pressure fluid actuated friction clutches for selectively coupling certain change speed and reverse gears to their respective shafts.

The shafting of the transmission 10 includes an input shaft 14; an intermediate shaft 16; a pair of output and reversing shafts 18 and 18'; a pair of pinion shafts 20 and 20'; and a tubular shaft 22 which is telescopically received about a portion of the intermediate shaft 16 and rotatably mounted thereto by bearing means generally indicated at 23 and 25.

The shafts 14, 16, 18, 18' and pinion shafts 20 and 20' are rotatably mounted in conventional bearing means in the front and rear walls of the transmission housing 12 as is well known in the art and, for example, as shown and described in co-pending patent application Serial No. 497,132 filed March 28, 1955 for Transmission, now Patent No. 2,953,841 issued September 27, 1960.

Input shaft 14 rotatably mounts a pair of gears 24 and 26, each of which has the same effective diameter and by way of illustration, are provided with fifty-six teeth. Gear 24 is selectively coupled to shaft 14 by a clutch generally designated 28. Clutch 28 is preferably of the multiple disc pressure fluid actuated type such as illustrated in detail in said co-pending application Serial No. 497,132.

Gear 26 is also selectively couplable to shaft 14 through a similar clutch generally designated 30. Input shaft 14 also has secured thereto a gear 32 which, by way of illustration, is provided with twenty-five teeth.

Intermediate shaft 16 has a pair of gears 34 and 36 secured thereto with gear 34 provided with eighty-one teeth and gear 36 provided with one hundred teeth. As illustrated, the eighty-one tooth gear 34 is in constant mesh with the fifty-six tooth gear 26 of shaft 14.

Shaft 16 rotatably mounts a gear 38 provided with ninety-two teeth, which gear is in constant mesh with the twenty-five tooth gear 32 secured to shaft 14. Gear 38 is selectively coupled to shaft 16 by clutch means generally designated 40. The clutch 40 diagrammatically illustrated in the drawings is of the multiple disc type with alternate clutch disc 42 mounted to rotate with a clutch housing 44 secured to one face 46 of the gear 38. The alternate discs 48 of clutch 40 are mounted to rotate with a hub 50 keyed to rotate with the shaft 16. Means, not shown, for urging the clutch discs 42 and 48 into frictional engagement cause gear 38 to rotate shaft 16.

Tubular shaft 22 rotatably mounted on shaft 16 by bearings 23 and 25 carries on its outboard end of a gear 52 provided with fifty teeth.

Tubular shaft 22 also has secured thereto a gear 54 having eighty-one teeth which gear is in constant mesh with the fifty-six tooth gear 24 of shaft 14. The inboard end 56 of tubular shaft 22 forms the inner hub of a clutch generally designated 58. The clutch 58 like clutch 40 is of the multiple disc type and is provided with a plurality of discs 60 mounted to rotate with the hub 56 and a plurality of alternate clutch discs 62 mounted to rotate with a housing 64 which housing is secured to face 66 of gear 38 whereby upon frictional engagement of the alternate discs 60 and 62, gears 52 and 54 may rotate with the gear 38 and with the gears 34 and 36 and shaft 16, if the clutch 40 is also the clutch-engaged position.

The transmission also includes the pair of parallel output shafts 18 and 18'. Shafts 18 and 18' are identical in form and only shaft 18 will be described in detail. Shaft 18 has rotatably mounted thereon a gear 68 provided with one-hundred-and-two teeth, which gear is in constant mesh with the hundred-tooth gear 36 secured to intermediate shaft 16.

Gear 68 rotatably mounted on shaft 18 is selectively coupled to rotate with the shaft by a conventional clutch 70 like clutches 28 and 30.

Shaft 18 also rotatably mounts a gear 72 provided with fifty-one teeth. The fifty-one tooth gear 72 is selectively coupled to shaft 18 by a clutch 74.

The transmission assembly also includes, as hereinbefore set forth, a pair of pinion shafts 20 and 20'. Each of the pinion shafts has secured thereto a gear 76 and 76' respectively. Gears 76 and 76' are provided with fifty-three teeth and the gears 76 and 76' are in constant mesh with the fifty-toothed gear 52 secured to the tubular shaft 22 telescopically mounted about intermediate shaft 16. Gear 76 is also in constant mesh with the fifty-one toothed gear 72 on shaft 18 while the corresponding gear 76' is in constant mesh with gear 72' rotatably mounted on shaft 18' and selectively couplable thereto.

Figure 2:
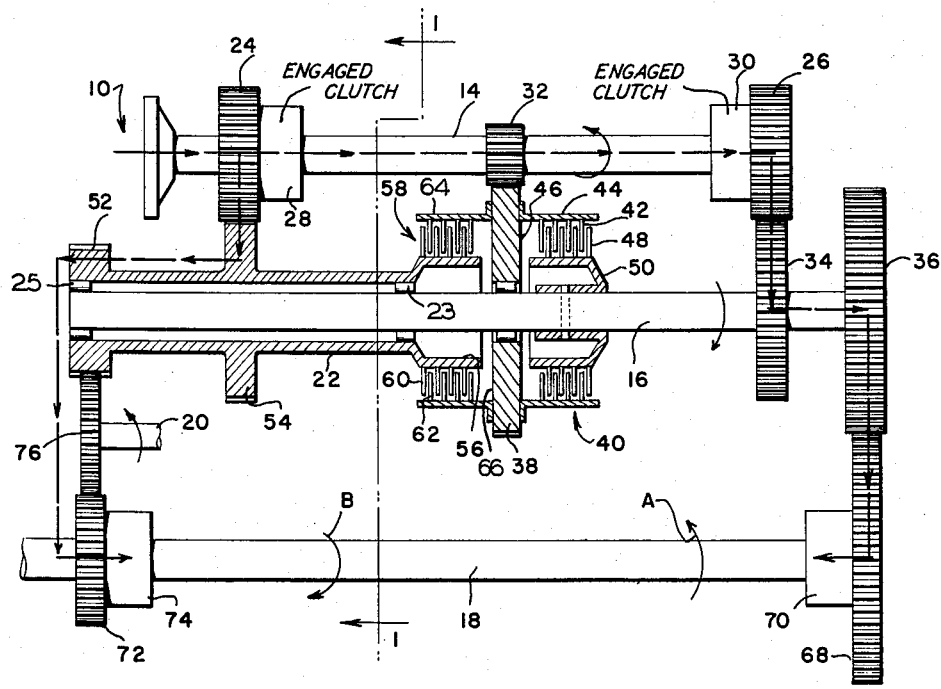
FIG. 2 is a fragmentary diagrammatic view of the transmission shown in FIG. 1 illustrating the power path used in the forward or reverse drive of one of the dual output shafts in the high speed range.

The transmission shown in FIGS. 1 through 4 provides, if mounted in a tractor having paired lateral ground-engaging crawlers, as shown in U.S. Patent 2,843,213 or connected to ground-engaging wheels 27 and 27' as illustrated in FIG. 2a, two speeds forward, two speeds reverse, and a geared power turn of the tractor in either direction, forward or reverse with one track going at a faster speed than the other. It is common in turning a crawler mounted tractor to brake one of the ground-engaging crawlers and to skid the tractor throughout the turn by applying power to the opposite crawler track.

It is also known as disclosed in said co-pending application, Serial No. 497,132 to provide for spin turns by applying power to opposite tracks in the opposite direction so that one track is moving forward and the other is moving in reverse. However, the best control, with minimum stress and strains on the brakes, the transmission and the crawlers, is obtained by making possible power turns in both the forward and reverse directions.

The operation of the transmission of the present invention will be particularly described in reference to FIGS. 2, 3 and 4 illustrating a portion of the drive relationships possible with the improved transmission.

In defining and describing the operation of the transmission in the specification and claims, the terms "forward" and "reverse" as applied to direction of rotation of shafts 18 and 18' denote the direction of rotation of these shafts which will impart forward or reverse direction of movement to the respective ground-engaging means 27 and 27' as illustrated in FIG. 2a. It will be particularly noted from FIG. 2a that clutch 70 of shaft 18 is the forward drive clutch for the right side of the vehicle while clutch 74' is the forward drive clutch for shaft 18', on the left hand side of the vehicle.

Referring to FIG. 2, with the input shaft 14 connected to a prime mover and clutches 28 and 30 engaged, gears 24 and 26 are coupled to the shaft 14 and rotatable therewith, to provide dual power paths through the transmission. In one of the power flow paths, gear 26 rotates gear 34 secured to shaft 16, which in turn rotates gear 36 which in turn drives gear 68.

The other power path is from gear 24 to gear 54, thence through sleeve shaft 22 to gear 52 which in turn rotates the pair of pinion gears 76 and 76' which gears mesh with gear 72 on shaft 18 and gear 72' on shaft 18' respectively. Since gears 24 and 54 have the same effective ratio as gears 26 and 34, tubular shaft 22 and shaft 16 rotate at the same speed and also in the same direction. The effective ratio of gears 36 and 68 is the same as the effective ratio between gear 52, pinion gear 76 and gear 72. Therefore, gears 72, 72', 68 and 68' rotate at the same speed. However, gears 72 and 72' rotate in the opposite direction from gears 68 and 68'; therefore, the operator, by selectively controlling clutch 70 or 74 on shaft 18, clutch 70' or 74' on shaft 18', may drive shafts 18 and 18' at the same speed in the same or opposite direction of rotation. For example, if clutch 70 on shaft 18 is engaged, shaft 18 would rotate as shown by the direction of directional arrow A while if clutch 74 were engaged, shaft 18 would rotate in the direction indicated by directional arrow B. The same selective choice is possible with the other of the dual output shafts 18'.

Referring specifically to FIG. 3 of the drawings, there is schematically illustrated the power path used to drive the dual output shafts in the low speed range in either direction of rotation. With shaft 14 rotating in the direction of the directional arrow and clutches 28 and 30 disengaged, gear 32 keyed to shaft 14 rotates gear 38 on shaft 16. By engaging clutches 40 and 58 coupled to opposite side of loose gear 38, shaft 16 and tubular shaft 22 are rotated at the same speed.

Power flow to the output shafts 18 and 18' is, therefore, through shaft 16, gear 36 to gear 68 or through tubular shaft 22, gear 52, and pinion gears 76 and 76' to gears 72 and 72' on shafts 18 and 18'. Again, the operator may selectively drive output shafts 18 and 18' in either direction of rotation in the low speed range by selectively engaging either clutch 70 or 74 on shaft 18 or clutch 70' or 74' on shaft 18'. It will be particularly noted that in reversing the direction of rotation of shafts 18 or 18', none of the gears in the transmission reverse direction. The only elements of the transmission reversing direction of rotation are the output shafts 18 and 18'.

In order to drive the shafts 18 and 18' at different relative speeds, the power flow path illustrated in FIG. 4 may be employed. In FIG. 4, with the shaft 14 rotating in the direction of the directional arrow and clutch 30 engaged, power is transmitted from the shaft 14 to gear 26, thence to gear 34 coupled ot shaft 16, thence through shaft 16 to gear 36, thence to gear 68 rotatably mounted on shaft 18 or to gear 68' rotatably mounted on shaft 18'. Further, as illustrated in FIG. 4, clutch 58 is engaged whereby power is also transmitted from shaft 14 through gear 32 to gear 38, thence via the clutch 58 to tubular shaft 22, then to gear 52. As hereinbefore described, gear 52 is in constant mesh with pinion gears 76 and 76' which transmit power to gear 72 on shaft 18 and gear 72' on shaft 18'. The operator, by selectively engaging clutch 70 or 74 on shaft 18 or clutch 70' or 74' on shaft 18' may drive either of the shafts in the high speed range or the low speed range.

By engaging clutch 70, shaft 18 is rotated in the high speed range in the direction of directional arrow "A" and by engaging clutch 74, shaft 18 is rotated in the low speed range in the direction of directional arrow "B."

In order to reserve this particular drive arrangement so that the shaft 18 will rotate in the direction of directional arrow "A" in the low speed range, clutch 28 would be engaged and clutch 30 would be disengaged, and clutch 58 would be disengaged and clutch 40 would be engaged.

From the foregoing description of the transmission illustrated in FIGS. 1 through 4, it will be seen that an improved change speed, reverse and geared turn transmission is provided having a single input shaft and plural output shafts, thereby fully accomplishing the aims and objects of the invention.

The advantages of the present invention are also fully accomplished in a transmission having a plurality of speed ratios. For example, in FIGS. 5 through 16, a modified form of the present invention is illustrated wherein a change speed, reverse and geared turn transmission is provided having four speeds forward, four speeds reverse and plural combinations of geared turns to the right, and to the left, in the forward or reverse direction of travel.

Figure 5:
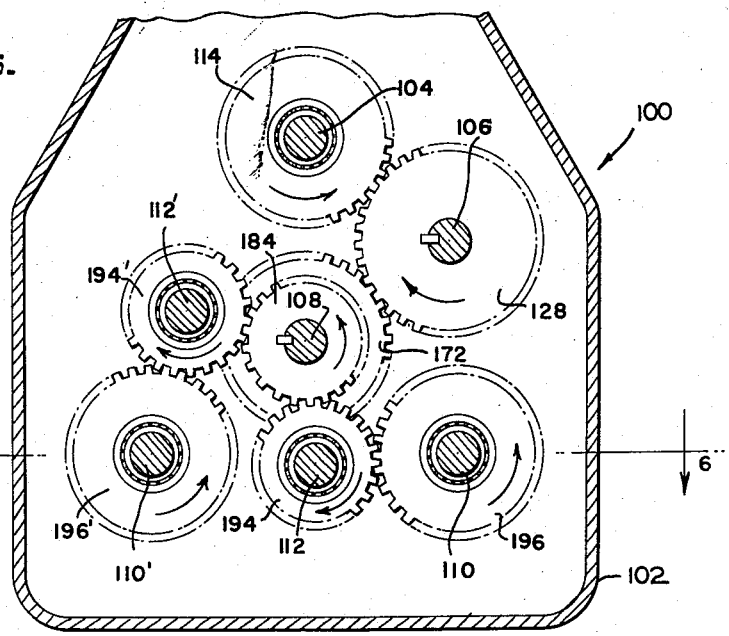
FIG. 5 is a fragmentary sectional view of a modified form of the present invention substantially on line 5—5 of FIG. 6.
Figure 6:
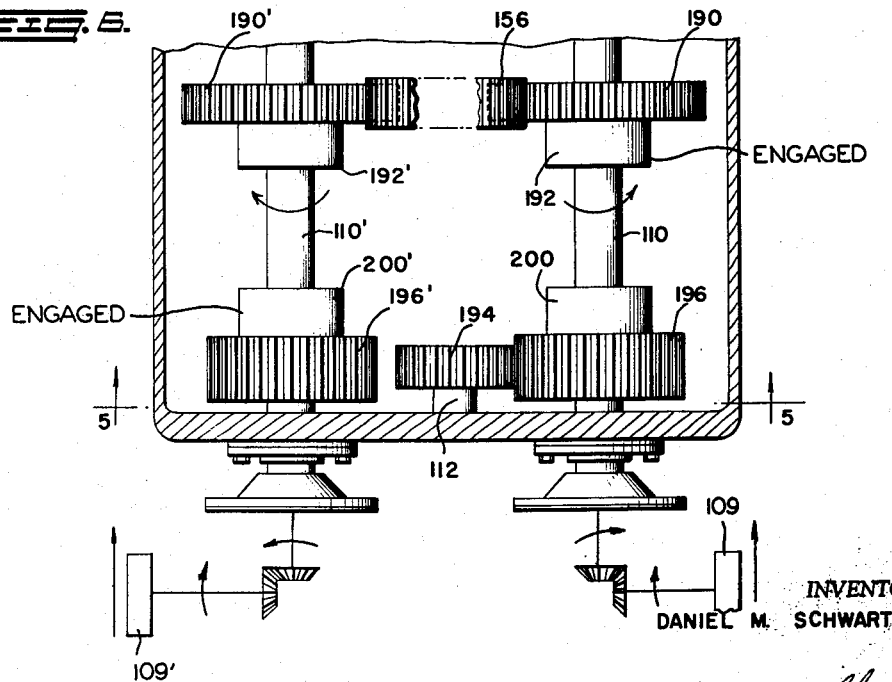
FIG. 6 is a sectional view substantially on line 6—6 of FIG. 5 showing a portion of the paired parallel output shafts.

Referring to the drawings and, in particular, to FIGS. 5, 6 and 7, there is shown a transmission generally designated 100 provided with a housing structure 102 which rotatably supports a plurality of parallel shafting. The transmission generally includes an input shaft 104, a first intermediate shaft generally designated 106, a second intermediate shaft generally designated 108, a pair of output shafts 110 and 110' and a pair of pinion shafts 112 and 112'.

The input shaft 104 is drivably connected to a prime mover and, for example, is adapted to rotate in the direction of the directional arrow C. The input shaft 104 rotatably mounts a pair of gears 114 and 116. Gear 114 has a larger effective diameter than gear 116 and by way of example, gear 114 may be provided with sixty-four teeth while gear 116 may be provided with fifty-one teeth.

Gear 114 is selectively coupled to input shaft 104 by a clutch 118 which, as described with reference to the form of invention shown in FIGS. 1 through 4, may be of the multiple disc pressure fluid actuated type. Gear 116 is also selectively coupled to shaft 104 by similar clutch means 120.

The first intermediate shaft 106 comprises a split shaft including a left-hand section 122 and a right-hand section 124. The two sections 122 and 124 are selectively coupled together by means of a multiple disc clutch generally designated 126. The clutch 126 may also be of the pressure fluid actuated type.

Shaft portion 122 has secured thereto a gear 128 having sixty-nine teeth, which gear is in constant mesh with gear 114 rotatably mounted on the input shaft 104. Shaft portion 124 has secured thereto a gear 132 provided with eighty-two teeth and in constant mesh with gear 116 rotatably mounted on the input shaft 104. First intermediate shaft 106, end portion 124, also has secured thereto a further gear 134 which gear may be provided with thirty-seven teeth.

Shaft 108 rotatably mounts a gear 136 provided with seventy-five teeth, which gear is in constant mesh with gear 134 secured to the end section 124 of first intermediate shaft 106. Gear 136 has a hub extension 140 to which is mounted a plurality of clutch discs 142 of clutch 145. The clutch discs 142 cooperate with alternate radially extending clutch discs 144 carried by a housing 146 which housing is secured to rotate with the second intermediate shaft 108 whereby upon frictional engagement of the alternate clutch discs 142 and 144, gear 136 will rotate second intermediate shaft 108.

Gear 136 also has a further hub 148 which carries a plurality of clutch discs 150. The clutch discs 150 cooperate with alternate radially extending clutch discs 152 mounted to rotate with hub 154 of a gear 156 having sixty teeth and rotatably mounted by suitable bearings on the second intermediate shaft 108. The assembly also includes means whereby the radially extending discs 150 and 152 may be brought into frictional engagement to provide a clutch 160 for selectively coupling gears 136 and 156.

Further, the gear 156 is provided with a hub 162 adjacent face 164. The hub 162 mounts for rotation therewith a plurality of clutch discs 166 which clutch discs cooperate with alternate radially extending clutch discs 168 mounted to a hub 170 of a gear 172 to provide a multiple disc clutch assembly 174. The gear 172 is also rotatably mounted on the shaft 108 by suitable bearing means and the gear 172 may be provided with sixty-four teeth, and is in constant mesh with gear 128 secured to rotate with first intermediate shaft section 122.

Gear 172 is also provided with a further hub portion 176 which supports a plurality of radially extending clutch discs 178. The clutch discs 178 cooperate with further clutch discs carried by a hub 180 to provide a clutch unit 182. The portion 180 of clutch unit 182 is secured to a further gear 184 provided with forty-five teeth and keyed to rotate with second intermediate shaft 108.

From the foregoing description of second intermediate shaft 108, it will be seen that the shaft rotatably supports three gears, 136, 156 and 172 and has secured thereto a gear 184. The second intermediate shaft assembly also includes four clutches 145, 160, 174 and 182.

The rotatably mounted gear 156 of second intermediate shaft 108 is in constant mesh with an 84 tooth gear 190 rotatably mounted on output shaft 110 and said rotatably mounted gear 156 is also in constant mesh with a further 84 tooth gear 190' rotatably mounted on output shaft 110'. Gears 190 and 190' are selectively coupled to their respective shafts 110 and 110' by multiple disc clutch means 192 and 192'.

Fixed gear 184 of second intermediate shaft 108 is in constant mesh with an idler gear 194 provided with forty-seven teeth and a further idler gear 194' which is also provided with forty-seven teeth. Idler gear 194 is in constant mesh with gear 196 provided with sixty-three teeth and rotatably mounted on output shaft 110.

Idler gear 194' is in constant mesh with a gear 196' provided with sixty-three teeth and rotatably mounted on output shaft 110'. Gear 196 is selectively coupled to output shaft 110 by a clutch 200 while the corresponding gear 196' is selectively coupled to output shaft 110' by a selectively engageable clutch means 200'.

The operation of the transmission illustrated in FIGS. 5 through 16 will be described in reference to specific power paths schematically shown in FIGS. 7 through 16.

In defining and describing the operation of this form of the transmission in both the specification and claims, the terms "forward" and "reverse" as applied to direction of rotation of shafts 110 and 110' denote the direction of rotation of these shafts which will impart forward or reverse direction of movement to the respective ground-engaging means 109 and 109' as illustrated in FIG. 6. It will be particularly noted from FIG. 6 that clutch 192 is the forward drive clutch for shaft 110 while clutch 200' is the forward drive clutch for shaft 110'.

Referring to FIG. 7, there is illustrated the power path used in the forward or reverse drive of output shaft 110 in the first speed range.

With a prime mover driving input shaft 104 in the direction of the directional arrow C and with clutches 120, 145 and 160 engaged power is transmitted from input shaft 104 to gear 190 on output shaft 110 through gear 116 to gear 132, thence through intermediate shaft section 124 to gear 134. Gear 134 drives gear 136 which in turn drives gear 156 which is in constant mesh with gear 190 on the output shaft whereby if clutch 192 on the output shaft 110 is engaged shaft 110 is driven in the forward direction in the first speed range.

Since gear 156 is also in constant mesh with gear 190' on output shaft 110' shaft 110' may also be driven from gear 190' in the first speed range.

Gear 136 on the second intermediate shaft 108 also drives gear 184 keyed to shaft 108. Gear 184 drives pinion gear 194 which is in constant mesh with gear 196 on output shaft 110. By engaging clutch 200 output shaft 110 is driven in the reverse direction in the first speed range.

Similarly, the other output shaft 110' may be driven in the forward direction in the first speed range by engaging clutch 200' to couple gear 196' to shaft 110'.

Referring to FIG. 8, there is illustrated the power path used in the forward or reverse drive of output shaft 110 in the fourth speed range.

With the prime mover driving input shaft 104 in the direction of the directional arrow C and with clutches 118, 174 and 182 engaged power is transmitted from input shaft 104 to gear 190 on output shaft 110 through gear 114 to gear 128, thence to gear 172 rotatably mounted on second intermediate shaft 108, thence to gear 156 also rotatably mounted on shaft 108 which gear is in constant mesh with gear 190 on the output shaft whereby, if clutch 192 on the output shaft 110 is engaged, shaft 110 is driven in the forward direction in the fourth speed range.

As described with reference to FIG. 7, gear 156 on the second intermediate shaft 108 also drives the corresponding gear 190' of the other output shaft 110' whereby upon engagement of clutch 192' of the second output shaft 110' the shaft is driven in the fourth speed range in the reverse direction.

Gear 172 on the second intermediate shaft 108 also drives gear 184 keyed to shaft 108. Gear 184 drives pinion gear 194 which is in constant mesh with gear 196 on output shaft 110. By engaging clutch 200 output shaft 110 is driven in the reverse direction in the fourth speed range.

Similarly, the other output shaft 110' may be driven in the forward direction in the fourth speed range by engaging clutch 200' to couple gear 196' to shaft 110'.

Referring to FIG. 9, there is illustrated the power path used in the forward or reverse drive of output shaft 110 in the third speed range.

With the prime mover driving input shaft 104 in the direction of the directional arrow C and with clutches 120, 126, 174 and 182 engaged power is transmitted from the input shaft 104 to gear 190 on the output shaft 110 through gear 116 to gear 132, thence through intermediate shaft sections 124 and 122 to gear 128 which, in turn, drives gear 172 rotatably mounted on the second intermediate shaft 108. Gear 172 drives gear 156 which is in constant mesh with gear 190 on the output shaft 110 whereby if clutch 192 on the output shaft is engaged, shaft 110 is driven in the forward direction in the third speed range.

Gear 172 on the second intermediate shaft 108 also drives gear 184 keyed to shaft 108. Gear 184 drives pinion gear 194 which is in constant mesh with gear 196 on output shaft 110. By engaging clutch 200, output shaft 110 is driven in the reverse direction in the third speed range. As described with reference to FIG. 7, the other output shaft 110' is similarly driven in the forward or reverse direction in the third speed range.

Referring to FIG. 10, there is illustrated the power path used in the forward or reverse drive of output shaft 110 in the second speed range.

With a prime mover driving input shaft 104 in the direction of directional arrow C and with clutches 118, 126, 145 and 160 engaged, power is transmitted from the input shaft 104 to gear 190 on output shaft 110 through gear 114 to gear 128 on the first intermediate shaft, thence through first intermediate shaft sections 122 and 124 to gear 134 keyed thereto. Gear 134 drives gear 136 on the second intermediate shaft 108 and this gear further drives gear 156 on the second intermediate shaft 108. Gear 156 is in constant mesh with gear 190 on the output shaft whereby if clutch 192 on the output shaft 110 is engaged, shaft 110 is driven in the forward direction in the second speed range.

Gear 136 on the second intermediate shaft 108 also drives gear 184 keyed to shaft 108. Gear 184 drives pinion gear 194 which is in constant mesh with gear 196 on output shaft 110. By engaging clutch 200, output shaft 110 is driven in the reverse direction in the second speed range.

The other output shaft 110' is similarly driven in the forward or reverse direction in the second speed range.

Referring to FIG. 11, there is illustrated the power path used in the forward drive of output shaft 110 in the first speed range or the reverse drive of output shaft 110 in the fourth speed range.

With the prime mover driving input shaft 104 in the direction of the directional arrow C and with clutches 118, 120, 160 and 182 engaged, power is transmitted from the input shaft 104 to gear 190 on output shaft 110 through gear 116 to gear 132, thence through intermediate shaft section 124 to gear 134. Gear 134 drives gear 136 which, in turn, drives gear 156 which is in constant mesh with gear 190 on the output shaft whereby if clutch 192 on the output shaft 110 is engaged, shaft 110 is driven in the forward direction in the first speed range.

Gear 114 on the input shaft 104 also drives gear 128 keyed to shaft 106. Gear 128 drives gear 172 which in turn drives gear 184. Gear 184 drives pinion gear 194 which is in constant mesh with gear 196 on output shaft 110. By engaging clutch 200, output shaft 110 is driven in the reverse direction in the fourth speed range.

The other output shaft 110 is similarly driven in the forward direction in the fourth speed range or the reverse direction in the first speed range whereby if the transmission illustrated in FIG. 11 is connected to a wheel propelled device as disclosed in United States Patent 2,843,213 issued July 15, 1958, a geared turn would be executed.

Referring to FIG. 12, there is illustrated the power path used in driving output shaft 110 in the forward direction in the fourth speed range or the reverse drive of the shaft 110 in the first speed range.

With the prime mover driving input shaft 104 in the direction of the directional arrow C and with clutches 118, 120, 145 and 174 engaged, power is transmitted from the input shaft 104 to gear 196 on the output shaft 110 through gear 116 to gear 132, thence through intermediate shaft section 124 to gear 134. Gear 134 drives gear 136 which, in turn, drives gear 184 keyed to the second intermediate shaft 108. Gear 184 drives pinion gear 194 which is in constant mesh with gear 196 on output shaft 110. By engaging clutch 200, output shaft 110 is driven in the reverse direction in the first speed range.

Gear 190 on output shaft 110 is driven by the input shaft 104 through gear 114 in constant mesh with gear 128 which gear is in constant mesh with gear 172 rotatably mounted on the second intermediate shaft 108. Gear 172 drives gear 156 also rotatably mounted on the second intermediate shaft 108. Gear 156 is in constant mesh with gear 190 on the output shaft 110 whereby if clutch 192 is engaged, shaft 110 is driven in the forward direction in the fourth speed range.

The other output shaft 110' is similarly driven in the reverse direction in the fourth speed range and in the forward direction in the first speed range.

Referring to FIG. 13, there is illustrated the power path used in the forward drive of output shaft 110 in the second speed range or the reverse drive of the output shaft 110 in the fourth speed range. With a prime mover driving input shaft 104 in the direction of the directional arrow C and with clutches 118, 126, 160 and 182 engaged, power is transmitted from the input shaft 104 to gear 190 on the output shaft 110 through gear 114 to gear 128, thence through intermediate shaft sections 122 and 124 to gear 134 keyed to shaft section 124. Gear 134 drives gear 136 which, in turn, drives gear 156 which is in constant mesh with gear 190 on the output shaft whereby, if clutch 192 on the output shaft 110 is engaged, shaft 110 is driven in the forward direction in the second speed range.

Shaft 110 is driven in the reverse direction in the fourth speed range through gear 114 which drives gear 128 on the first intermediate shaft 106 which gear is in constant mesh with loose gear 172 on second intermediate shaft 108. Gear 172 drives gear 184 keyed to shaft 108. Gear 184 drives pinion gear 194 which is in constant mesh with gear 196 on output shaft 110. By engaging clutch 200, output shaft 110 is driven in the reverse direction in the fourth speed range.

The other output shaft 110' is similarly driven in the forward direction in the fourth speed range and in the reverse direction in the second speed range.

Referring to FIG. 14, there is illustrated the power path used in the forward drive in the fourth speed range of output shaft 110 or the reverse drive of output shaft 110 in the second speed range.

With a prime mover driving input shaft 104 in the direction of the directional arrow C and with clutches 118, 126, 145 and 174 engaged, power is transmitted from the input shaft 104 to gear 190 on the output shaft 110 through gear 114 which is in constant mesh with gear 128 on first intermediate shaft section 122. Gear 128 drives gear 172 on the second intermediate shaft and gear 172 drives gear 156 which is in constant mesh with gear 190 on the output shaft whereby if clutch 192 on the output shaft 110 is engaged, shaft 110 is driven in the forward direction in the fourth speed range.

Shaft 110 is driven in the reverse direction in the second speed range through gear 114 coupled to the input shaft 104. Gear 114 drives gear 128 keyed to the first intermediate shaft 106. Power is transmitted from gear 128 through first intermediate shaft sections 122 and 124 to gear 134. Gear 134 drives gear 136 which, in turn, drives gear 184 keyed to the shaft 108. Gear 184 drives pinion gear 194 which is in constant mesh with gear 196 on output shaft 110. By engaging clutch 200, output shaft 110 is driven in the reverse direction in the second speed range.

Similarly, the second output shaft 110' is driven in the reverse direction in the fourth speed range and in the forward direction in the second speed range.

Referring to FIG. 15, there is illustrated the power path used in the forward drive of output shaft 110 in the third speed range or the reverse drive of output shaft 110 in the first speed range.

With a prime mover driving input shaft 104 in the direction of the directional arrow C and with clutches 120, 126, 145 and 174 engaged, power is transmitted from input shaft 104 to gear 190 on the output shaft 110 through gear 116 to gear 132, thence through intermediate shaft sections 124 and 122 to gear 128 keyed to the shaft section 122. Gear 128 is in constant mesh with gear 172 on the second intermediate shaft 108 and drives gear 156 which is in constant mesh with gear 190 on the output shaft whereby if clutch 192 on the output shaft 110 is engaged, shaft 110 is driven in the forward direction in the third speed range.

It will also be seen that gear 116 in driving gear 132 also drives gear 134 keyed to shaft section 124. Gear 134 drives gear 136 on the second intermediate shaft 108. Gear 136 also drives gear 184 keyed to shaft 108 and gear 184 drives pinion gear 194 which is in constant mesh with gear 196 on output shaft 110. By engaging clutch 200, output shaft 110 is driven in the reverse direction in the first speed range.

The other output shaft 110' is similarly driven in the reverse direction in the third speed range or the forward direction in the first speed range.

Referring to FIG. 16, there is illustrated the power path used in the forward drive in the first speed range of the output shaft 110 or the reverse drive of the output shaft in the third speed range.

With a prime mover driving input shaft 104 in the direction of the directional arrow C and with clutches 120, 126, 160 and 182 engaged, power is transmitted from the input shaft 104 to gear 190 on output shaft 110 through gear 116 to gear 132, thence through intermediate shaft section 124 to gear 134. Gear 134 drives gear 136 which, in turn, drives gear 156 which is in constant mesh with gear 190 on the output shaft 110 whereby if clutch 192 thereon is engaged, shaft 110 is driven in the forward direction in the first speed range.

Gear 132 on the first intermediate shaft 106 also drives gear 128 keyed to first intermediate shaft section 122. Gear 128 drives gear 172 rotatably mounted on second intermediate shaft 108. Gear 172 drives gear 184 which drives pinion gear 194 which is in constant mesh with gear 196 on output shaft 110. By engaging clutch 200, output shaft 110 is driven in the reverse direction in the third speed range.

Similarly, the second output shaft 110' is driven either in the reverse direction in the first speed range or in the forward direction in the third speed range.

From the foregoing description, it will be seen that the present invention provides substantially improved power transmission means which fully accomplish the aims and objects hereinbefore set forth. It will be further appreciated by those skilled in the art that various modifications may be made in the transmissions without departing from the scope of the appended claims. For example, the form of the clutch means for coupling selectively couplable gears to various shafts of the transmission may be variously modified without affecting the operation of the improved transmission.

It should be noted in the form of the invention illustrated in FIGS. 5–16 that clutch 126 is not required if simple geared turns with one track in first gear and the other track in fourth gear for either direction of rotation are required, as shown in FIGS. 7, 8, 11 and 12. The addition of clutch 126 allows geared turns with one track in fourth gear and the other track in second gear, or one track in first gear and the other track in third gear, as shown in FIGS. 13, 14, 15 and 16.

In summary, it will be noted that the transmission shown in FIGS. 5–16 provides four speeds forward and four speeds reverse; eight different spin turns, including four spin turn speeds to the left and four spin turn speeds to the right; and twelve different geared turns. Further, it will be apparent to those skilled in the art that omission of some of the clutches, such as clutch 126, would reduce the number of combinations, but the essential advantages of the transmission could still be obtained.

In addition, as in conventional tractors, the output shaft clutches on shafts 110 and 110'; or 18 and 18'; can be disengaged to one track only so that power is only applied to the opposing track in either forward or reverse direction at any of the selected speeds to drive the tractor in a conventional skid turn with power applied to one track and the other track either held by its brake or allowed to idle freely during the turn.

Similar subject matter is disclosed in United States patent application Serial No. 809,258 filed April 27, 1959, for Transmission, D. M. Schwartz et al. now Patent 2,953,942.

I claim:

1. A transmission including an input shaft, at least one intermediate shaft, and a pair of output shafts, constant mesh non-direction-reversing change speed gear means between the input shaft and the intermediate shaft, further gear means between the intermediate shaft and each of the output shafts, and engageable and disengageable clutch means cooperating with said gear means and said further gear means to drive selectively the output shafts at preselected speeds relative to the input shaft and at selected speed ratios and directions of rotation relative to each other.

2. The transmission defined in claim 1 wherein said further gear means include reversing gears between the intermediate shaft and each of the output shafts to drive said output shafts at preselected speeds and directions of rotation relative to each other.

3. A dual output shaft transmission wherein the output shafts are simultaneously and selectively rotatable at different relative speeds including an input shaft, an intermediate shaft and a pair of output shafts, constant mesh change speed gear sets between the input shaft and the intermediate shaft, at least one gear of each of the change speed gear sets being rotatably mounted on and selectively, couplable with its respective shaft and at least two of said rotatably mounted gears of the change speed gear sets being couplable with the intermediate shaft, further constant mesh gear means connecting each of the output shafts to the intermediate shaft and clutch means for coupling the couplable gears to their respective shafts.

4. The dual output shaft transmission defined in claim 3 wherein said further constant mesh gear means include reversing gear means between the intermediate shaft and each of the output shafts.

5. The dual output shaft transmission defined in claim 3 wherein said further constant mesh gear means connecting each of the output shafts to the intermediate shaft include loose gears on and selectively couplable to the output shafts and clutch means for coupling said selectively couplable gears to the output shafts.

6. The dual output shaft transmission defined in claim 5 wherein said loose gears of said further constant mesh gear means drive said output shafts in forward or reverse direction.

7. A transmission including an input shaft, an intermediate shaft, and a pair of output shafts, a pair of constant mesh gear sets between the input shaft and the intermediate shaft, a further constant mesh gear set between the input shaft and the intermediate shaft, constant mesh forward and reversing gear sets between the intermediate shaft and each of the output shafts, and engageable and disengageable clutch means cooperating with said gear sets to drive selectively said output shafts at preselected speeds relative to the input shaft and at selected speed ratios relative to each other.

8. The transmission defined in claim 7 wherein each of said pair of constant mesh change speed gear sets between the input shaft and the intermediate shaft drive the intermediate shaft at the same speed relative to the input shaft.

9. The invention defined in claim 7 wherein said constant mesh forward and reversing gear sets connecting each of the output shafts to the intermediate shaft include loose gears on and selectively coupled to the output shafts.

10. The transmission defined in claim 7 wherein one of the gears of each of said pair of gear sets between the input shaft and the intermediate shaft is rotatably mounted on the input shaft and selectively coupled thereto.

11. The invention defined in claim 10 wherein one of the gears of said further set of constant mesh gear sets is rotatably mounted on the intermediate shaft and selectively rotatable therewith.

12. A transmission including a power input shaft, a pair of output shafts and a plurality of intermediate shafts, means connecting said input shaft with said output shafts through said intermediate shafts in serial succession, said connecting means including change speed gear sets between the input shaft and the first in series of the intermediate shafts, further change speed gear sets between the first in series of the intermediate shafts and the other of the intermediate shafts, direction changing gear sets between the last in series of the intermediate shafts and said output shafts, engageable and disengageable clutch means cooperating with said gear sets to drive selectively said output shafts at preselected speeds relative to the input shaft and at preselected speed ratios and directions relative to each other.

13. A transmission including a power input shaft, a pair of power output shafts, and a plurality of intermediate shafts, means connecting said input shaft with each of said output shafts through said intermediate shafts in serial succession, said connecting means including change speed gear sets between the input shaft and the first in series of the intermediate shafts, further change speed gear sets between each of the intermediate shafts, direction changing gear sets between the last in series of the intermediate shafts and each of said output shafts, at least one gear of each of the change speed gear sets being rotatably mounted on and selectively rotatable with its respective shaft, at least two of said rotatably mounted gears of the change speed gear sets being selectively rotatable with the intermediate shafts, and engageable and disengageable clutch means cooperating with said gear sets to drive selectively each of said output shafts at preselected speeds relative to the input shaft and at selected speed ratios and directions of rotation relative to each other.

14. The invention defined in claim 13 wherein one of said intermediate shafts comprises a pair of coaxial shaft portions, and engageable and disengageable friction clutch means selectively coupling said pair of coaxial shaft portions.

15. The invention defined in claim 14 wherein said coaxial intermediate shaft portions comprise the first in series of said intermediate shafts.

16. The invention defined in claim 15 wherein a pair of change speed gear sets interconnect the input shaft and the first in series of the intermediate shafts with one of said change speed gear sets between the input shaft and one of the coaxial shaft portions of said first in series of the intermediate shafts and the other of said change speed gear sets is between the input shaft and the other of the coaxial shaft portions.

17. The invention defined in claim 16 wherein one of the gears of each of the pair of change speed gear sets between the input shaft and the first in series of the intermediate shafts is rotatably mounted and selectively coupled to the input shaft.

18. A dual output shaft transmission wherein dual output shafts may be independently driven simultaneously in the same or opposite directions of rotation at the same or at different speeds of rotation relative to an input shaft comprising an input shaft, dual output shafts, and at least one intermediate shaft between the input shaft and the output shafts, a plurality of constant mesh change speed gear sets interconnecting the input shaft and said output shafts, said change speed gear sets comprising a first set of change speed gears including a first gear on the input shaft in constant mesh with a first input gear on the intermediate shaft and a second set of constant mesh gears including a second gear on the input shaft in constant mesh with a second input gear on the intermediate shaft, at least two output gears on said intermediate shaft, a pair of gears on each of the output shafts, one of said output gears on said intermediate shaft being directly connected to one of the gears on each of said output shafts and another of said gears on said intermediate shaft being interconnected through a reversing pinion to each of the other of said gears on each of said output shafts, first clutch means for selectively driving one of said output gears on said intermediate shaft with said first set of change speed gears, second clutch means operable independently of said first clutch means for selectively driving the other of said output gears of said intermediate shaft with the second set of change speed gears, third clutch means operable independently of said first and second clutch means for coupling together said first and second output gears of said intermediate shaft when only one of said output gears on said intermediate shaft is engaged with a change speed gear set, and clutch means for selectively coupling one or the other gear of each of the pairs of gears on the output shafts with its respective output shaft.

References Cited in the file of this patent

UNITED STATES PATENTS

| | | |
|---|---|---|
| 2,088,110 | Lamb | July 27, 1937 |
| 2,953,942 | Schwartz et al. | Sept. 27, 1960 |
| 3,050,164 | Bowen et al. | Aug. 21, 1962 |